United States Patent
Liu et al.

(10) Patent No.: US 6,873,878 B2
(45) Date of Patent: Mar. 29, 2005

(54) THROUGHPUT ANALYSIS SYSTEM AND METHOD

(75) Inventors: Kuei-Yi Liu, Kaohsiung (TW);
Kuo-Hua Chen, Tao Yuan Hsien (TW);
De-Cheng Weng, Hsinchu Shin (TW);
Long-Fan Lin, Hsinchu Hsien (TW);
Chiung-Fang Hsieh, Tao Yuan Hsien (TW)

(73) Assignee: MACRONIX International Co., Ltd., Hsinchu (TW)

(*) Notice: Subject to any disclaimer, the term of this patent is extended or adjusted under 35 U.S.C. 154(b) by 4 days.

(21) Appl. No.: 10/156,335

(22) Filed: May 24, 2002

(65) Prior Publication Data

US 2003/0187535 A1 Oct. 2, 2003

(30) Foreign Application Priority Data

Apr. 2, 2002 (TW) ........................................ 91106566 A

(51) Int. Cl.$^7$ ............................................. G06F 19/00
(52) U.S. Cl. .................... 700/111; 700/104; 700/108
(58) Field of Search ................................ 700/104, 108, 700/111

(56) References Cited

U.S. PATENT DOCUMENTS

| | | | | |
|---|---|---|---|---|
| 5,740,065 A | * | 4/1998 | Jang et al. ..................... | 716/1 |
| 6,136,614 A | * | 10/2000 | Funk ............................. | 438/5 |
| 6,405,096 B1 | * | 6/2002 | Toprac et al. ................ | 700/121 |
| 6,549,822 B1 | * | 4/2003 | Toprac ......................... | 700/121 |
| 6,630,995 B1 | * | 10/2003 | Hunter ..................... | 356/237.5 |
| 2001/0028473 A1 | * | 10/2001 | Yamasaki et al. .......... | 358/1.15 |

* cited by examiner

*Primary Examiner*—Leo Picard
*Assistant Examiner*—Michael D. Masinick
(74) *Attorney, Agent, or Firm*—J.C. Patents

(57) ABSTRACT

The present invention provides a throughput monitoring and analysis system and method, comprising: a factor-fetching means and a terminal means. Wherein the factor-fetching means fetches a plurality of raw time data of the production factors corresponding to selected operation events during execution of operation events of the complex machine. The terminal means stores the time data and related information of the production factors and displaying the monitoring results according to set required condition and the data and information.

16 Claims, 11 Drawing Sheets

FIG. 3b

| wafer lot code | raw material code | machine control table code |
|---|---|---|
| 2D010100 | 41;P5110-160CN1 | PH006#0 |
| 2D010200 | 41;P5110-160CN1 | PH006#0 — 611 |
| 2D048901 | 24;P5098-156D1 | PH006#0 — 612 |
| 2D031300 | 41;P5110-160CN1 | PH006#0 — 613 |
| 2C808000 | 24;P5097-156C1 | PH006#0 — 614 |
| 2C785901 | 24;P5097-156C1 | PH006#0 |
| 2C548202 | 24;P5097-156C1 | PH006#0 |
| 2C798200 | 24;P5097-156C1 | PH006#0 |
| 2C825504 | 24;P5099-156B1 | PH006#0 |
| 2C846600 | 42;P5099-160NR1 | PH006#0 |
| 2C825003 | 24;P5099-158B1 | PH006#0 |
| M20001912 | 41;P5110-160CN1 | PH006#0 — 615 |
| 2C867300 | 24;P5098-156D1 | PH006#0 — 616 |
| 2C886100 | 24;P5098-156D1 | PH006#0 |
| 2C806000 | 24;P5097-156C1 | PH006#0 |
| 2C471300 | 42;P5098-160FN1 | PH006#0 |
| 2C825002 | 42;P5099-160NR1 | PH006#0 |
| 2C905001 | 24;P5098-156D1 | PH006#0 |
| 2C846300 | 24;P5098-156D1 | PH006#0 |
| 2C824500 | 24;P5098-158D1 | PH006#0 |
| 2C825004 | 24;P5099-159B1 | PH006#0 |
| 2D048900 | 42;P5098-160FN1 | PH006#0 |
| 2C827000 | 42;P5099-160NR1 | PH006#0 |
| 24125407 | 9;TD@T9459-146A | PH006#0 |
| 2D177101 | 13;P6536-121B | PH006#0 |
| 2D036502 | 41;P5110-160CN1 | PH006#0 |
| 2D025701 | 41;P5110-160CN1 | PH006#0 — 617 |
| 2C825503 | 24;P5099-156B1 | PH006#0 — 618 |

FIG. 6a

| wafer lot code | spare time after unloading | load port standby time | $T_{init}$ | $T_{loss}$ | delay | message |
|---|---|---|---|---|---|---|
| 2D028803 | 115 | 2 | 457 | -141 | 447 | 2D028803 6531180G1 no mask in the control table |
| 2D385300 | 40 | 476 | 390 | -310 | 552 | 2D385300 5119120A1 no mask in the control table |
| 2C700801 | 58 | 467 | 396 | -303 | 553 | 2C700801 6532180GT1 no mask in the control table |
| 2D227500 | 91 | 956 | 1035 | -192 | 1088 | 2D227500 6526146B1 no mask in the control table |
| 2D115900 | 230 | 10 | 1408 | -123 | 1386 | 2D115900 6536107A1 no mask in the control table |
| 2D121104 | 95 | 7 | 807 | -176 | 769 | 2D121104 5118160BS1 no mask in the control table |
| 2D067900 | 312 | 1 | 497 | -275 | 631 | 2D067900 6536180AM1 no mask in the control table |
| 2D032201 | 13 | 15 | 1031 | -240 | 1132 | 2D032201 6532180AM1 no mask in the control table |
| 2D121100 | 1007 | | 506 | -223 | 588 | 2D121100 5118160AT1 no mask in the control table |
| 2D070500 | 338 | 2199 | 906 | -195 | 964 | 2D070500 6526180B1 no mask in the control table |
| 2D277200 | 125 | | 405 | -120 | 383 | 2D277200 5116160AL1 no mask in the control table |
| 2D435800 | 155 | 1 | 395 | -224 | 478 | 2D435800 5123120A1 no mask in the control table |
| 2D322300 | 28 | 433 | 2996 | -125 | 2976 | 2D322300 5098146A1 no mask in the control table |

FIG. 6b

THROUGHPUT ANALYSIS SYSTEM AND METHOD

CROSS-REFERENCE TO RELATED APPLICATION

This application claims the priority benefit of Taiwan application serial no. 91106566, filed Apr. 2, 2002.

BACKGROUND OF THE INVENTION

FIELD OF THE INVENTION

The present invention relates in general to a throughput analysis system and a method of controlling each operation event of a machine unit using the same.

The conventional method of throughput analysis of fabrication machine analyze the throughput using the fabrication record of each individual machine. However, if the throughput of only one machine is analyzed, the overall throughput of the fabrication cannot be calculated merely from the fabrication record of either the fabrication event or the complex production equipment. Even if an analysis result is obtained, the objective of increasing throughput cannot be achieved by this way because it does not provide a global analysis of the entire fabrication events. In addition, the fabrication record of the machine cannot be obtained in real time. The analyzed data obtained includes only the sum of production time of each individual machine as shown as the upper part of FIG. 1. Further, the above mentioned throughput analysis the data can be obtained by analyzing the fabrication record of the previous day or previous month ago can be analyzed. Thus, such analyzed data cannot allow the machine operator to resolve the fabrication problem in real time.

The invention provides a throughput analysis system that collects time data of more than two operation events performed by two different machines simultaneously. The operation time data of the fabrication of two or more individual machines can be obtained. In addition, the system can function as a real time analysis tool. Each time when the operation event of a batch of products is complete, the system retrieves the analysis data including information, for example, raw time data of each operation steps of the operation event immediately.

The monitoring system of the present invention can monitor at least a machine unit comprising a at least two different machines and a machine server. Wherein the machine server controls the execution of at least one operation event of the machine unit and each operation event further comprises a plurality of operation steps.

The diagram illustrates that present invention provides a method of retrieving time data of the operation steps in every time segment of a machine unit . Accordingly, the proper sizing of the machine units can be implemented to eliminate any bottle-necks in the entire production line. Further, the operator or the engineer can resolve the problem immediately by comparing the actual production time with the predetermined production time. The time data of the operation steps are analyzed in order to identify the exact operation step in which the error or delay occur so that the correction to that operation step(s) can be implemented immediately to resolve the problem to avoid further delay in the fabrication. For example, adjustments can be made either upstream and or down stream processing to avoid delay or bottle-neck with the view of increasing the throughput of the fabrication.

The present invention provides a throughput analysis system comprising: a data retrieving means and a terminal means. Wherein the data retrieving means is used for retrieving the raw time data corresponding to each operation steps of the operation event. The terminal means is used for storing the time data and related information of the operation steps for conveniently displaying the analysis results according to the actual time data of the operation steps and comparing with the corresponding time data previously stored data and information. Wherein the operation step comprises at least two actions, and an idle time between two actions. The analysis result is the actual average throughput time in terms of one operation event. Alternatively, the analysis result can also be in the form of analysis and statistics table including various operation events with respect to a selected operation steps. The terminal means further comprises a standard value setting device for setting optimum standard values of the operation parameters of the of the operation steps corresponding to each operation event. Furthermore, the terminal means allow the operator or the engineer to set a time of the operation step, which is the optimum standard values. The terminal means further comprises an abnormality indicating device, which device comprises a comparing means for comparing the actual time of the operation step with the corresponding standard value and displaying the abnormality indication in case of, for example, mismatch of the actual time of the operation step and the corresponding standard value. Therefore the user can easily visualize which operation is causing delay, and can be immediately corrected. Moreover the terminal means can be programmed with predetermined error messages so the cause of the abnormality can be immediately displayed for immediate attention of the operator.

The present invention also provides a method for monitoring the fabrication events of at least one machine unit, wherein each execution of fabrication events comprises a plurality of operation steps.

The monitoring method comprising: retrieving and storing the time data of the selected operation step of an operating machine; and analyzing and displaying the results according to the prescribed condition and stored data.

Both the foregoing general description and the following detailed description are exemplary and explanatory only and are not restrictive of the invention, as claimed.

BRIEF DESCRIPTION OF THE DRAWINGS

FIG. 3b is the timing diagram of the throughput analysis of the present invention;

FIG. 6a is a schematic drawing illustrating the abnormality with special markings according to the present invention;

FIG. 6b is a schematic drawing illustrating the cause of the abnormality indicated in FIG. 6a;

Referring to FIG. 2, an embodiment of the throughput analysis system according to the present invention is shown. The system can monitor at least one machine unit such as machine unit 200 or machine unit 210. The system performs an analysis using a plurality of time data output from the machine unit 200 or 210. The machine unit comprises at least one or more than one machines, each of which executes at least one operation event.

Figure 1:
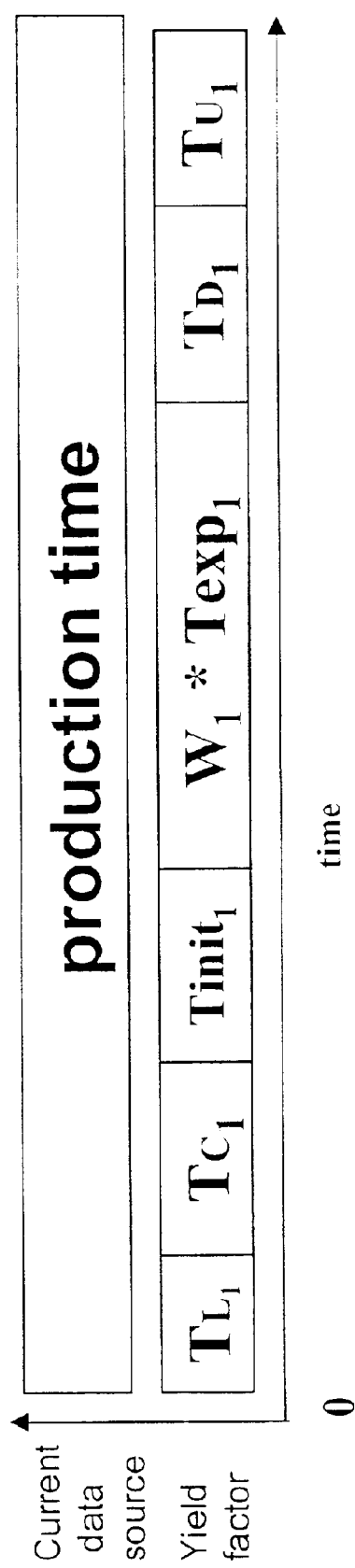
FIG. 1 is a schematic drawing of the prior art and the present invention.
Figure 2:
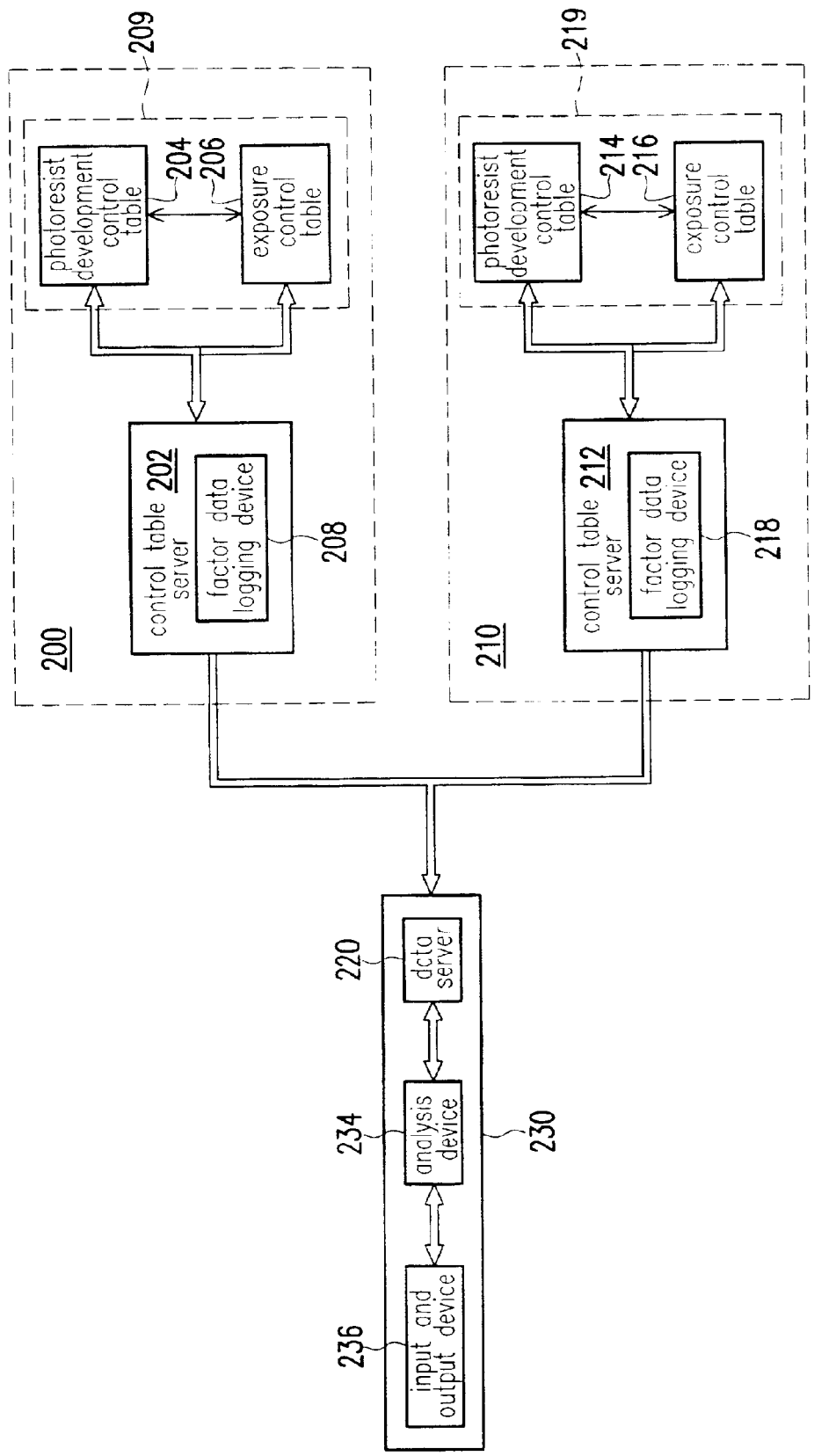
FIG. 2 is a block diagram of the present invention.

Machine unit 200, for example, comprises a machine 209 and a machine server 202. Wherein the machine 209 comprises an upper photoresist developing control machine 204 and an exposing machine control machine 206. The machine server 202 is used to control the machine 209 to execute at least one operation event.

The throughput analysis system of the present invention is capable of monitoring machine units 200 and 210 using a monitoring system. The following describes the operation of a machine unit 200, which can also be used to operate a single complex machine.

The above-mentioned monitoring system comprises a data retrieving means 208 and a terminal means 230. The data retrieving means 208 is disposed in the original control program of the machine server 202 and is used for retrieving time data corresponding to various operation events. The time data is transmitted to a SECSII interface device (not shown).

The terminal means 230 receives and stores the time data of the corresponding to various operation events through the SECSII interface device. The received data is used for calculating and analyzing the throughput of the machine units 200 and or 210, and for displaying the results of the calculations and analysis according to the prescribed condition set by the user. The terminal means 230 comprises a data server 220, a readable and writable data analysis means 234, and an I/O device 236. The terminal means 230 can analyze or calculate using the data stored in data server 220 and display the results.

Figure 3A:
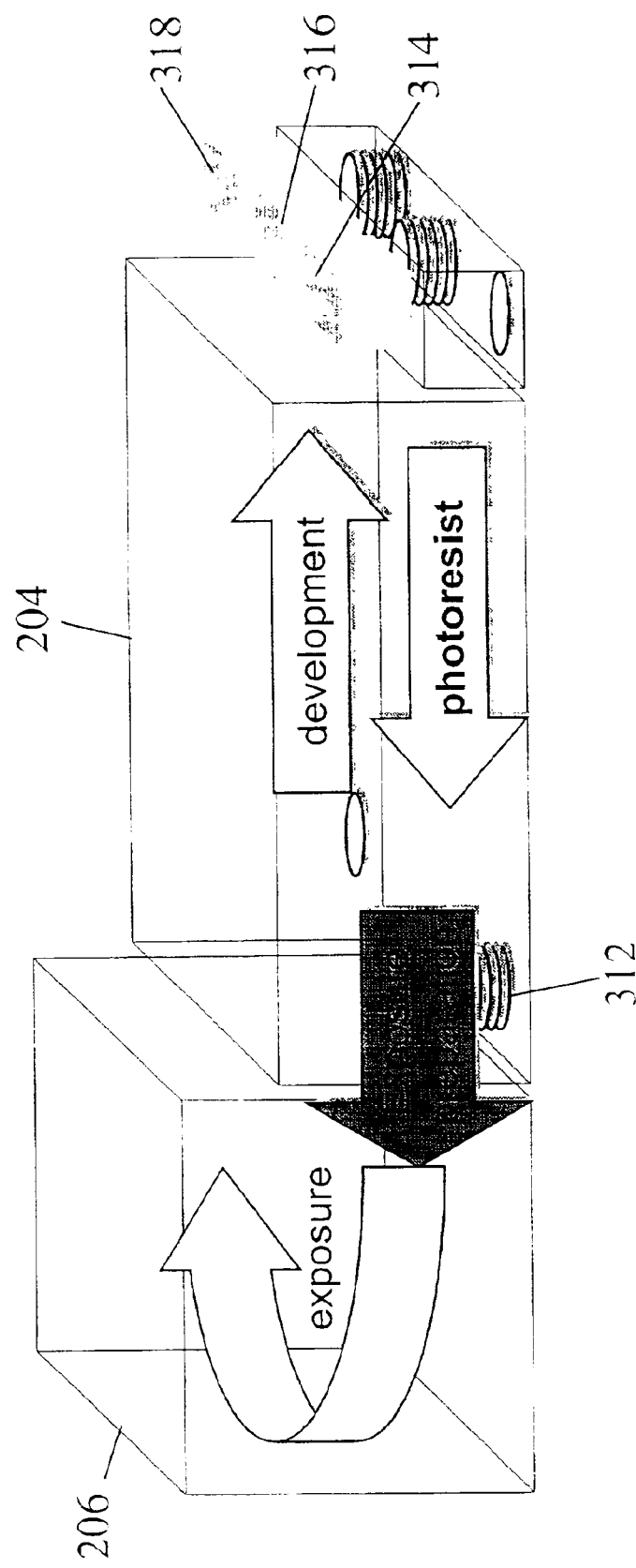
FIG. 3a is the schematic drawing of the photolithography machine unit of the present invention.

As shown in FIG. 3a, the machine 209 such as a photolithography machine comprises an exposure control machine 209 and a photoresist development control machine 204. The exposure control machine 209 and the photoresist development control machine 204 perform different operations but are required to perform the operation in a synchronized manner.

The operation of the photoresist development control machine 204 is described as follows. The photoresist development control machine 204 forms a photoresist layer on each of the wafers transmitted from the load ports 314, 316 and 318 according to the recipe provided during loading step. The wafers with the photoresist layers are temporarily stored in the exposure buffer area 312 where the photoresist layers are exposed for transferring a pattern of a photomask using a exposure control machine 206. After exposure step, the wafers are transferred back to the photoresist development control machine 204 where the pattern is developed. The wafers are then unloaded from the photoresist development control machine 204.

Figure 3B:
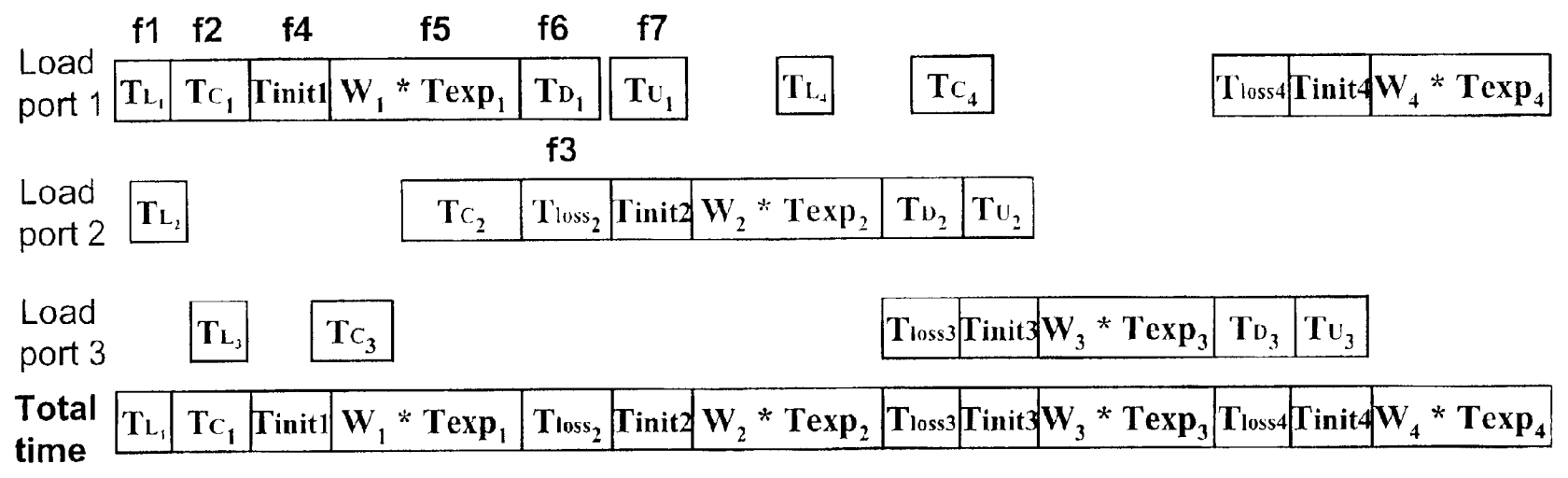

Accordingly, a series of operation procedures are executed for forming a photoresist pattern beginning from loading till unloading of wafers. A time data is generated for each of the above operation step. As shown in FIG. 3b, the time data of loading the wafers in the 3 load ports is illustrated. In each operation step, there is a starting point and an ending point. The time data of the operation steps of the machine can be immediately retrieved by the data retrieving means to generate the exact starting time. The time data, for example, can be indicated and displayed for each of the operation step as listed below.

TL: time for loading the wafer by the photoresist development control machine;

TC: time for forming the photoresist layer in the photoresist development control machine;

Tloss: idle time for the wafer spent in the exposure control machine;

Tinit: time for preparing exposure of the exposure control machine;

Texp: time for exposure of the exposure control machine;

TD: time for development of the photoresist exposure control machine; and

TU: time for unloading the wafer from the photoresist development control machine.

The time data of the operation steps are transmitted to the data server 220 through SECSII interface and stored in analysis means 234 for analysis.

Analysis means 234 is a analysis program software which can calculate the actual average throughput time of the machine 209 in a single time segment. The actual average throughput time is obtained by dividing the predetermined time segment by the sum of the actual time of the operation steps of the machine 209. Furthermore, the time data for each operation step can be analyzed and determined according to the required condition set by the user. The I/O device 236 allows the user to input the required monitoring condition for retrieving the calculation and analysis results from the analysis means 234 that can be visually displayed in the machine monitor.

Referring to FIG. 3B, the calculation of the average throughput time from the analysis means 234 is illustrated. The time data for operations steps beginning from the loading of the wafers in the 3 load ports until the unloading of the wafer can be preset as the predetermined time segment. The exact execution time of the machine for loading 3 load ports in a predetermined time frame can be determined from the diagram. Although the 3 load ports is separately executed, the execution time of the operation steps of each load port still overlaps with each other and therefore complex, for example, when load port 1 unloads the first wafer (production factor of Tu1), the load port 2 places the second wafer into the exposure region 312 (production factor of Tu2: when exposure control machine 306 is ready to expose).

Figure 4:
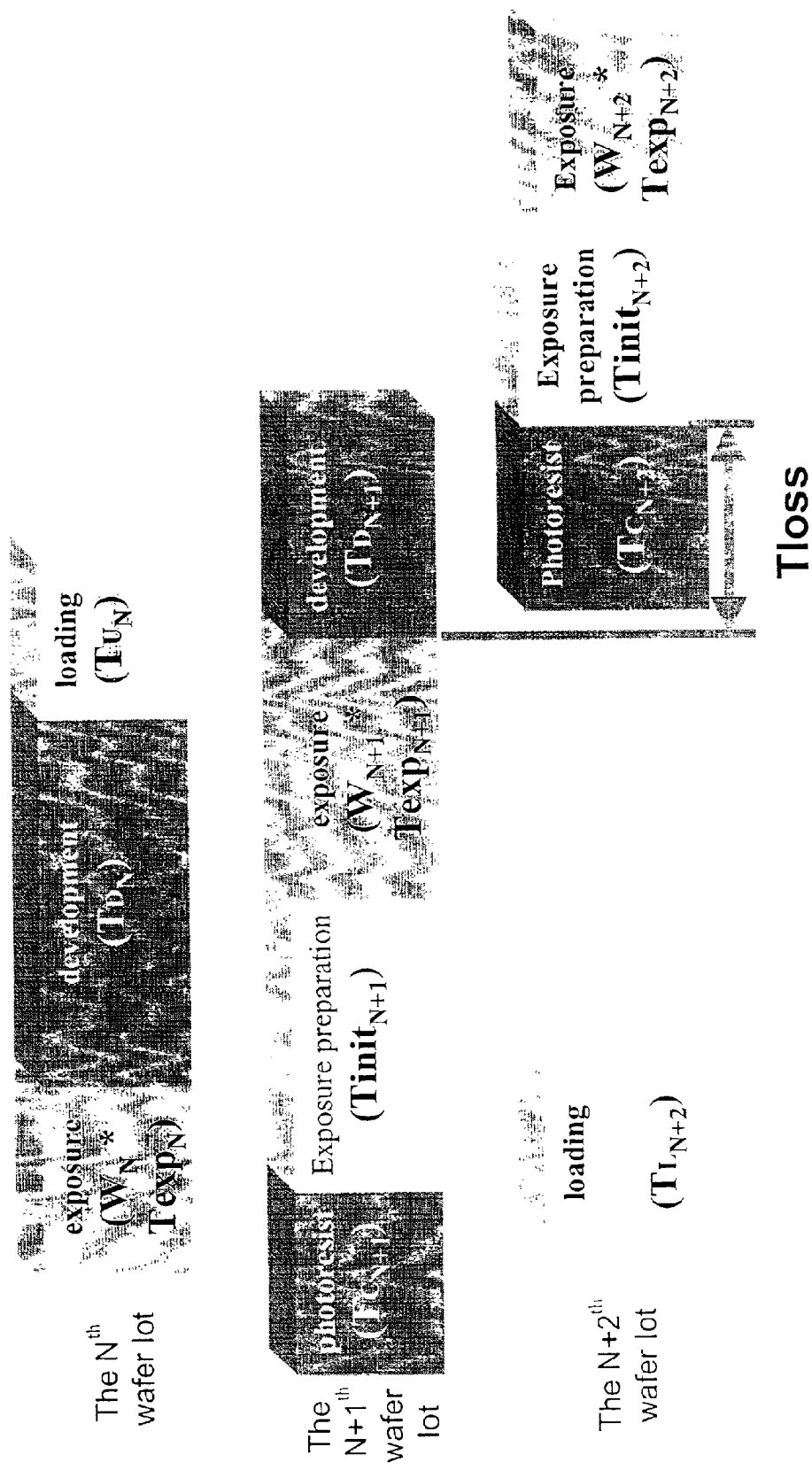
FIG. 4 is a schematic drawing indicating the idle time between two operation steps according to a preferred embodiment of the present invention.

FIG. 4 illustrates the calculation method for calculating the Tloss. As illustrated in FIG. 4, when machine performs the exposure step on the N+1 wafer, in theory exposure is actually performed on the N wafer and the formation of the photoresist is performed on the N+1 wafer but the timing of the formation of the photoresist performed on the N+2 wafer is delayed until approximately the development of the N+1 wafer begins. As a consequence, the time after the exposure of the N+1 wafer and before exposure of the N+2 wafer on the exposure control machine 206 is the delay or idle time (Tloss) of the wafer processing. This time data of the operation event is also known as idling time.

Therefore the real average throughput value can be calculated by applying the below mathematical function after obtaining the time data corresponding to the predetermined production factors.

Real average throughput value=Actual number of wafers processed (Wafer out)/Actual production time (Hour)

Actual number of wafers (Wafers out)=$W1+W2+\ldots+WN$

Actual production time (Hours)=$TL1+TC1+[(Tinit1+W1*Texp1)+(Tloss+Tinit2+W2*Texp2)+\ldots+(TlossN+TinitN+WN*TexpN)]+TDN+TUN$ Wherein W represents the wafers of the 3 load ports. The actual production time of this embodiment is:

$$TL1+TC1+[(Tinit1+W1*Texp1)+(Tloss+Tinit2+W2*Texp2)+ (Tloss3+Tinit3+W3*Texp3)]+TD3+TU3.$$

The average throughput value is equal to the total number of the wafers divided by the actual production time.

By using the above calculation method, an accurate throughput value of any operation segment can be obtained.

Furthermore, the analysis means 234 has a capability of analyzing the time data of the operation events using the related information saved in the data server 220 and output the results of the analysis that reflect upon the efficiency/inefficiency pinpointing to the quality of a specific operation step of the machine. Alternatively, the analyzed data can be directly displayed to I/O device 236.

Figure 5:
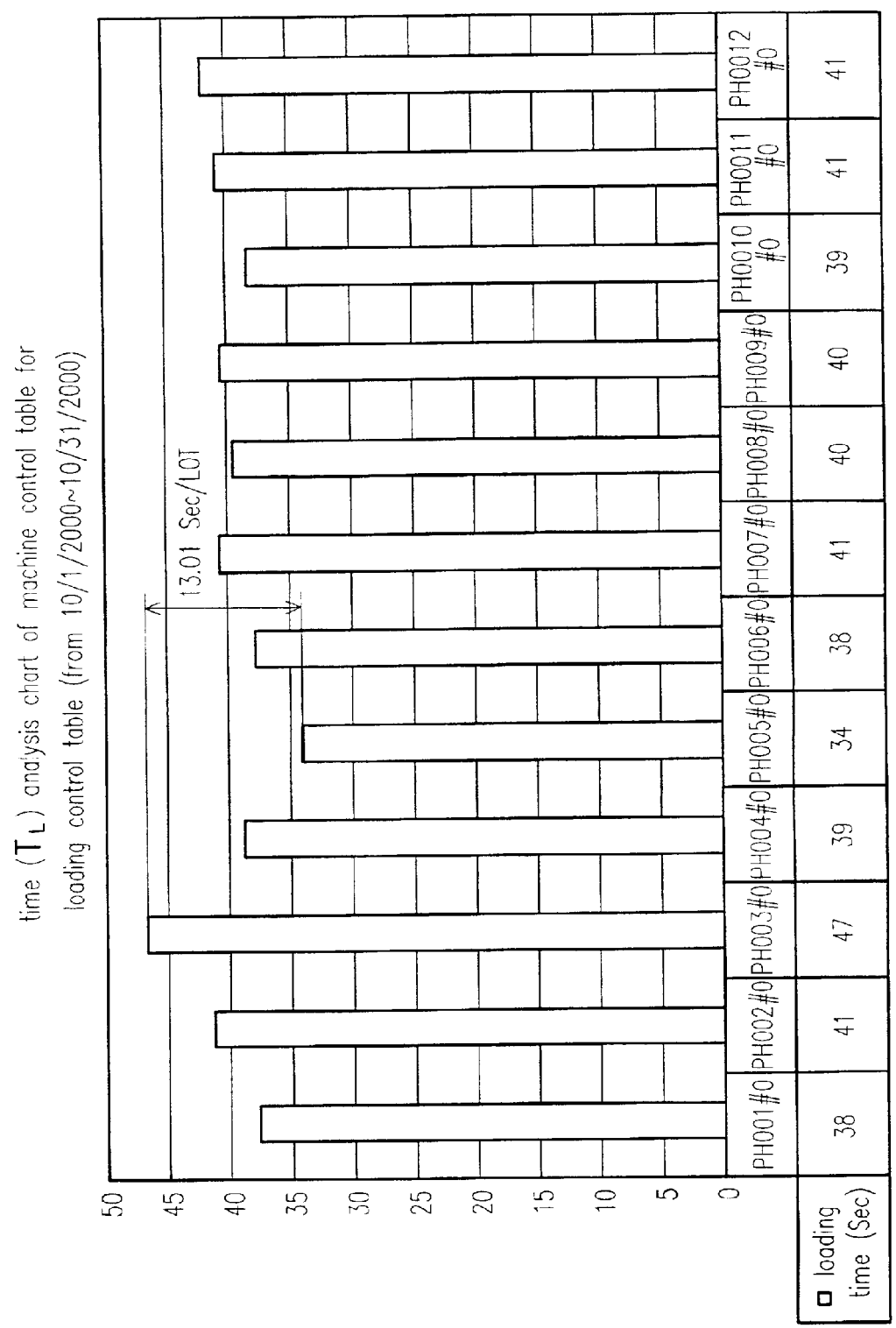
FIG. 5 is a time chart of the average production time for loading wafers according to the present invention.

Further, analysis means 234 can also generate a variety of production reports and charts according to the data related to the events stored in data server 220. As shown in FIG. 5, the time data of the operation step, "loading of wafer", can be obtained by retrieving the average time that each machine requires to load a lot of wafers in a predetermined operation segment. It is also equivalent to the time data of the operation step "TL" of all machine units in the same time frame.

Results from the operation indicate that machine PH003 requires the longest time for loading wafers, therefore evidently, the operator can determine whether the production factor of machine PH003 is normal and accordingly investigate the problem.

Analysis means 234 can further comprise a default setting device (not shown) for analyzing and displaying abnormalities of the operation steps and an abnormality indication device for indicating any abnormalities in the operation event. According to the standard time values of the operation events are stored in the data server 220, the analysis means 234 has a display means to display a report of abnormality in the I/O device 236. The abnormality indication device, for example, will indicate any abnormality in a different color such as pink, as illustrated in FIG. 6a.

If we purposefully delay the time of an operation step of a certain machine, for example PH006, as shown in the analysis report of FIG. 6b, the abnormality indication device will display the abnormality in red color (611, 612, 613, . . . , 618). As a result, the problem can be immediately addressed and solved so the time of wafer processing will not be discontinued to decrease the throughput.

The standard values of the operation parameters mentioned above can be directly inputted to the data server by the user or can be generated by a standard value setting device (not shown). The generated standard values are shared with the temporary storage devices. The standard value setting device uses a predetermined mathematical function to set the optimum standard values of the of the operation parameters. For example, the standard value setting device can automatically generate the default time data for a selected operation event with a given operation steps.

Furthermore, the abnormality indication device of the analysis means 234 can also indicate abnormality of the operation step. For example, a 'cause' database can be established in the data server 220 for utilization by the analysis means 234. The analysis means 234 will assign a first cause for the delay of the time data of a certain operation step when it overruns the first predetermined time and displays the first cause in the I/O device 236. When the time data of the same operation step extends the second predetermined time, a second cause will be displayed. The abnormality with special markings (621, 622, . . . , 624) in the operation step of initiating exposure is illustrated in FIG. 6(b) for example.

Figure 7:
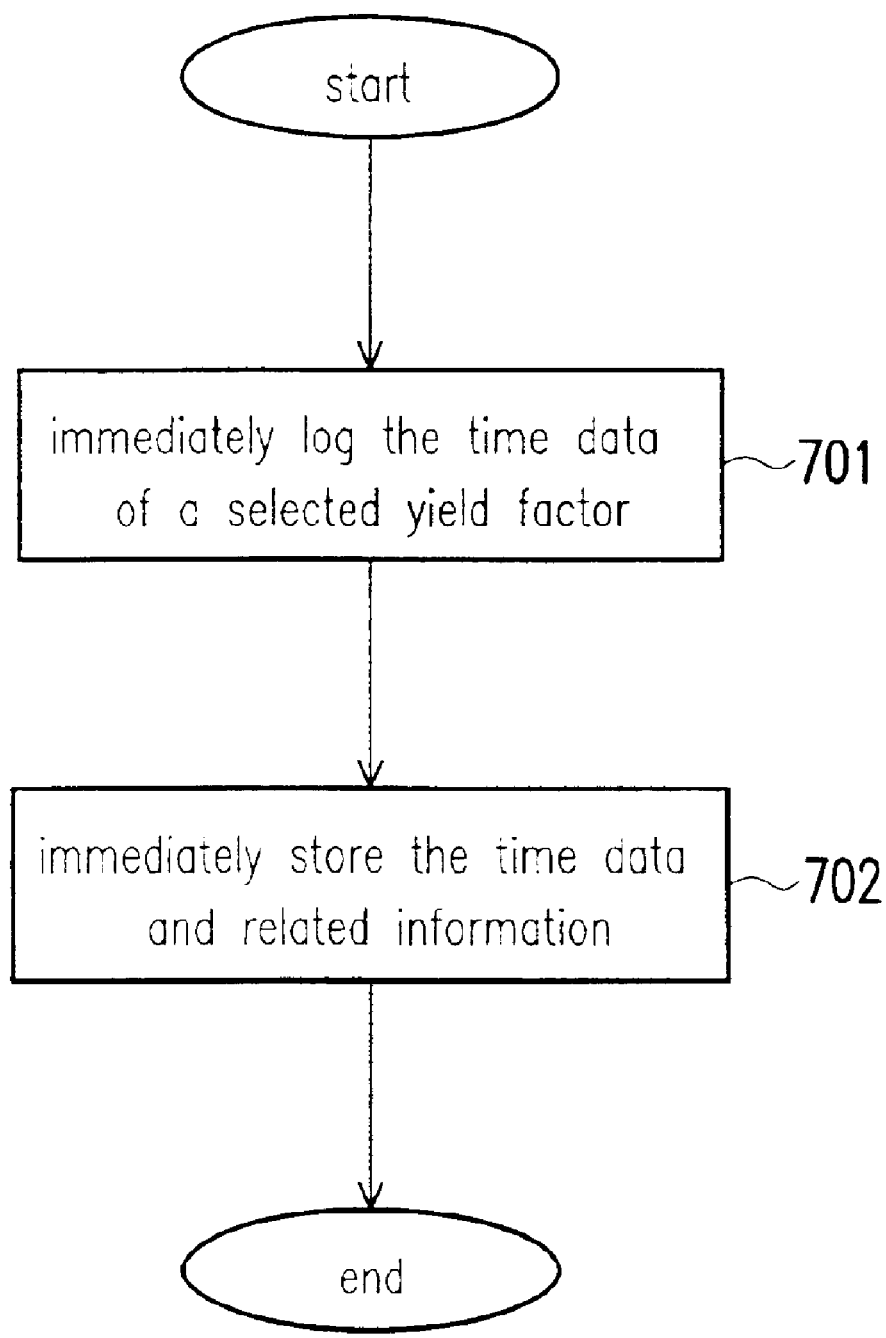
FIG. 7 is a flow chart of the present invention.
Figure 8:
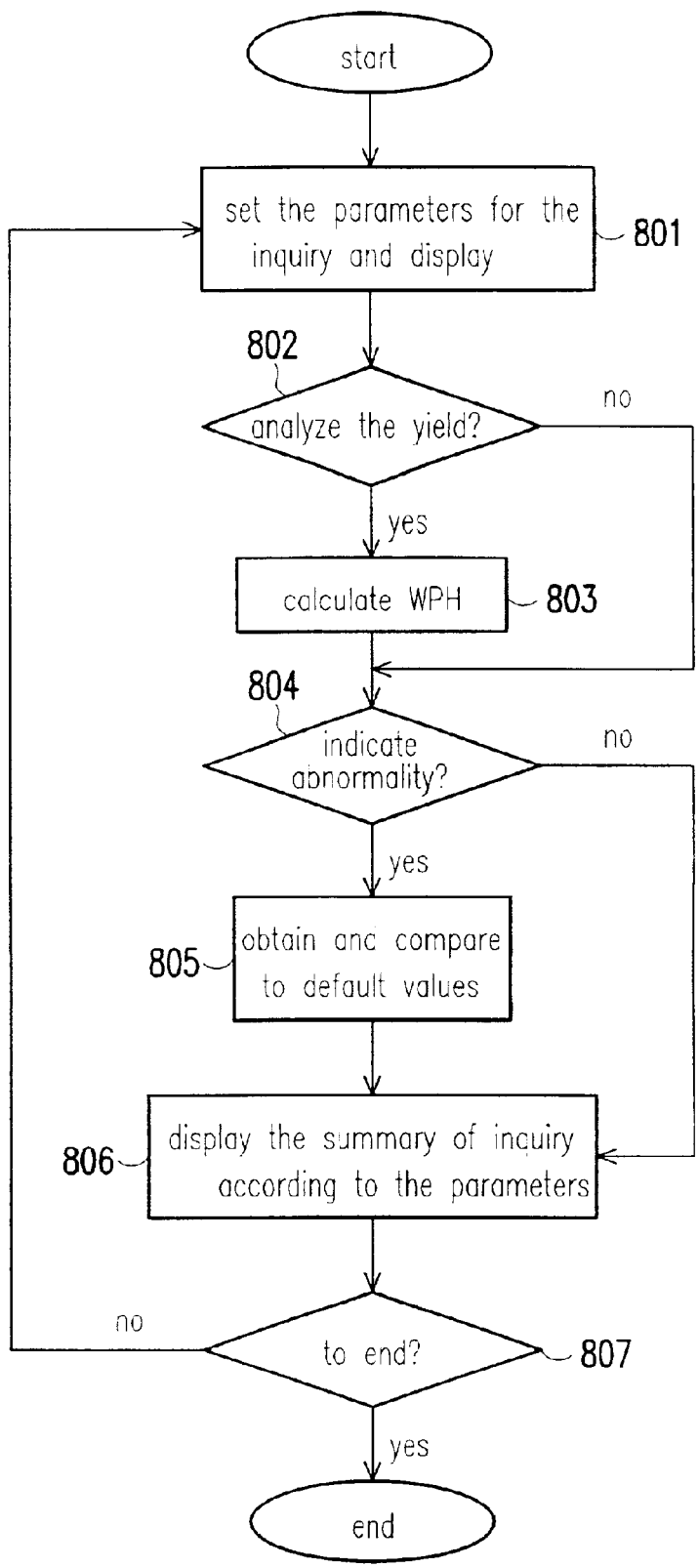
FIG. 8 is a flow chart of the present invention.
Figure 9:
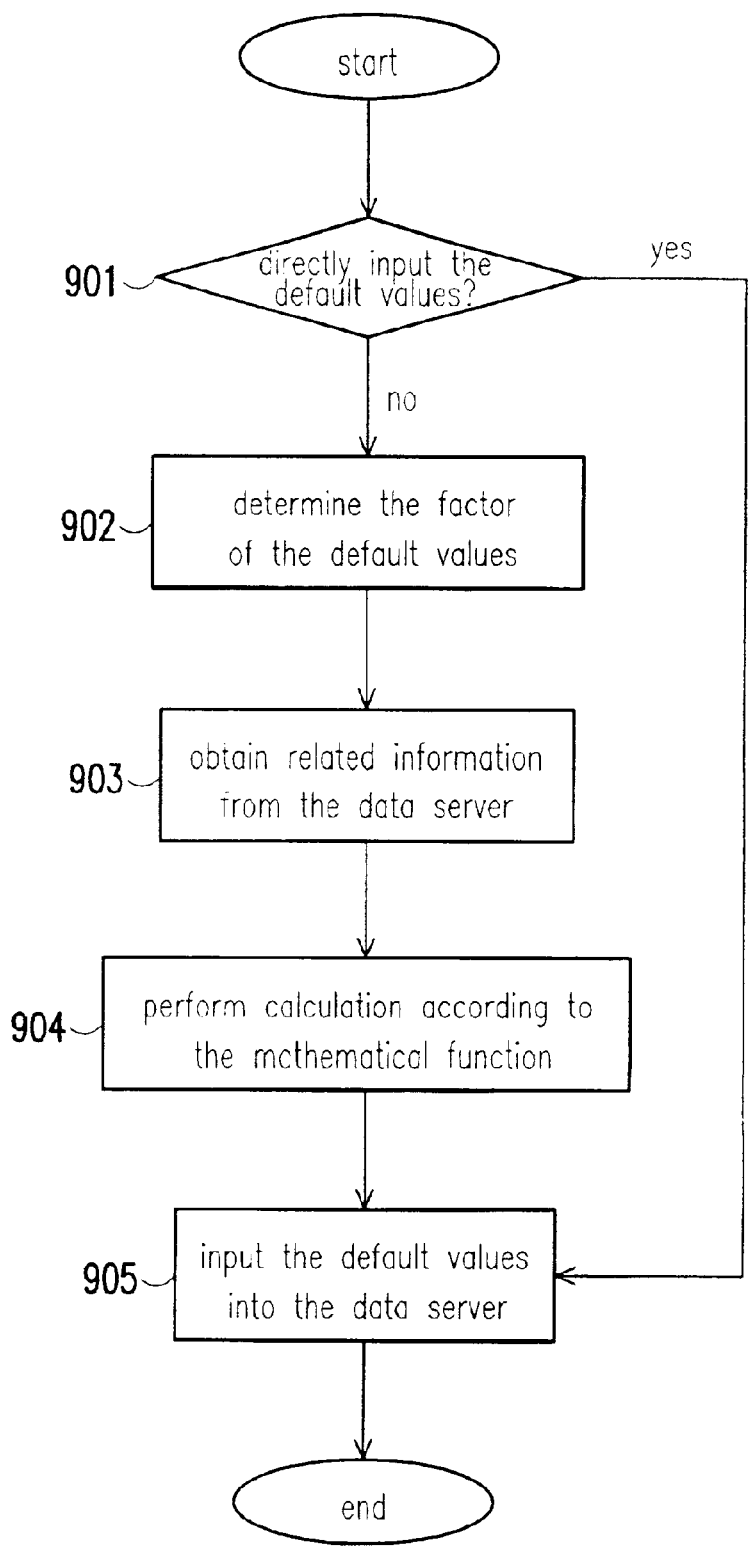
FIG. 9 is a flow chart illustrating the set of standard values of the operation parameters according to the present invention.

FIGS. 7, 8, and 9 are the flow charts of the monitoring steps according to the preferred embodiment of the present invention.

The monitoring event is mainly divided into two parts, the first part is the immediate retrieving and storing and the second part is readily inquiring and analyzing. The retrieving and storing process is illustrated in step 701 in FIG. 7. When machine starts the process, retrieving means 208 will immediately retrieve the time data and related information corresponding to the initializing point of the selected operation event. After retrieving the time data, step 702 is performed to transmit the time data to the terminal means 230 in the data server 220. The time data is then stored in the data server 220 that can be for analysis in later stages, this ends the first part of the monitoring event.

When the user inquires the results of the of the operation event, the monitoring event enters the second part which is the inquiring and analyzing event, as illustrated in FIG. 8. In step 801, the user sets the fields of inquiry such as the items, time, format, required condition, etc . . . through the I/O device 236. In the following step 802, the analysis means 234 determines whether the throughput analysis is required. If so, in step 803, the WPH is calculated using the data stored in data server 220 according to the various operation events of the machine. In step 804, whether or not an "abnormal" should be displayed is determined. For doing so, in step 805, a standard value of the selected operation event is obtained for comparing, and in step 806, the results are displayed in the I/O device 236 according to the inquiry items set by the user. In step 804, if no abnormality is determined, then the event will proceed to step 806 to display the inquired data. Furthermore, back in step 802, if the inquiry does not relate to the throughput analysis, it will automatically jump to step 804 and continue according to the above procedures.

In step 805, the standard value can be a value set by the user or an automatically generated standard value related to the operation event. FIG. 9 illustrates the standard value setting device for obtaining an optimum standard value in the setting step. For this reason, the analysis means 234 has a programmed mathematical function to perform the calculations. By entering a setup mode, the analysis means 234 can set the standard value according to the average value or additional calculations from, for example, various operation events of the machine.

FIG. 9 illustrates the part where the standard values are set. In step 901, it is determined whether the standard value is directly inputted or is set by the monitoring system. If the standard value is to be set, in step 902, the production factor of the standard value is determined. In the following step 903, the data is retrieved from server 220. In step 904, a mathematical function is run to perform the calculations. Lastly, in step 905, the standard value is stored in the data server 200. If the standard value is to be directly inputted back in step 901, the process proceeds to step 905, the standard values are directly inputted.

The above embodiment specifically uses a photolithography machine as an example to illustrate the present invention but it is not limited to only photolithography machine, any kind of manufacturing machine unit can be used to practice the teachings of the present invention. The throughput analysis system of the present invention is applicable to any machine unit of any industry for manufacturing any product. The system monitors and analyses every single throughput time segment to reflect the cause of the problem that can be easily found and corrected by the operator.

The benefits of a complex machine is the adaptability of two or more different and multi-purpose machines in a different configurations. The system of the present invention analyses the average throughput and the time data of every operation events accurately and efficiently.

Other embodiments of the invention will appear to those skilled in the art from consideration of the specification and practice of the invention disclosed herein. It is intended that the specification and examples to considered as exemplary only, with a true scope and spirit of the invention being indicated by the following claims.

What is claimed is:

1. A throughput analysis system, for monitoring at least one machine unit comprising two or more machines and a server, wherein the server is used for controlling at least one operation event of the machine unit, and wherein said operation event comprises a plurality of operation steps, the throughput analysis system comprising:

a retrieving means, far retrieving a plurality of time data corresponding to each of said operation steps;

a storing means, for storing the time data; and calculation means, for calculating an average throughput of the machine unit, wherein the average throughput is calculated by a following equation, average throughput value=actual number of wafers process (wafer out)/actual production time (hour), wherein actual number of wafers (wafers out)=W1+W2+ . . . +WN, where W1 represents a first wafer, W2 represent a second wafer and WN represents an Nth wafer, actual production time (hour)=TL1+TC1+[(Tinit1+W1*Texp1)+(Tloss2+Tinit2+W2*Texp2)+ . . . +(TlossN+TinitN+WN*TexpN)]+TDN+TUN, and wherein T represents time, TL1 represents time for loading the first wafer by a photoresist development control machine, TC1 represents time for forming a photoresist layer on the first wafer in the photoresist development control machine for the first wafer, Tinit1 represent time for preparing an exposure of an exposure control machine for the first wafer, Texp1 represents time for the exposure of the exposure machine for the first wafer, Tloss2 represents idle time of the second wafer in the exposure control machine, Tinit2 represent time for preparing an exposure of the exposure control machine for the second wafer, Texp2 represents time for the exposure of the exposure machine for the second wafer, TlossN represents idle time of the Nth wafer in the exposure control machine, TinitN represent time for preparing an exposure of the exposure control machine for the Nth wafer, TexpN represents time for the exposure of the exposure machine for the Nth wafer, TDN represents time for development of a photoresist exposure control machine of the Nth wafer, and TUN represents time for unloading the Nth wafer from the photoresist development control machine.

2. The throughput analysis system as claimed in claim 1, further comprises a terminal means comprising:

a data server, for storing the time data and related information;

an analysis means, for analyzing the time data and the related information stored in the data server in accordance with the required condition and displaying the result of the analysis on a monitor of the machine unit; and an I/O device, for inputting the required condition and outputting the analysis results.

3. The throughput analysis system as claimed in claim 1, wherein each of the time data correspond to an actual starting/ending time of each of the operation steps.

4. The throughput analysis system as claimed in claim 1, wherein the calculation means is installed in the server.

5. The throughput analysis system as claimed in claim 2, wherein the terminal means is a standard value setting device for setting a standard value of said operation steps.

6. The throughput analysis system as claimed in claim 1, further comprises an abnormality indication device for comparing the time data with the standard values and displaying abnormalities indication according to results of the comparison.

7. The throughput analysis system as claimed in claim 1, further comprises a standard value setting device for setting values of various parameters of said operation steps.

8. The throughput analysis system as claimed in claim 6, wherein the abnormality device displays a cause for the abnormalities.

9. The throughput analysis system as claimed in claim 1, wherein the machine unit is a photolithography control machine unit comprising a photoresist development control machine and an exposure control machine.

10. A method for analyzing throughput of a machine unit comprising two or more machines and a server, wherein the server is used for controlling at least one operation event comprising a plurality of operation steps, the method comprising:

retrieving time data and its related information corresponding to each of said operation step;

storing time data and its related information of said operation steps into a data server;

calculating an average throughput of the machine unite according to the data stored in the data server in accordance with an inquiry, wherein;

the average throughput is calculated by a following equation;

average throughput value=actual number of wafers process (wafer out)/actual production time (hour);

wherein actual number of wafers (wafers out)=W1+W2+ . . . +WN, where W1 represents a first wafer, W2 represent a second wafer and WN represents an Nth wafer;

actual production time (hour)=TL1+TC1+[(Tinit1+W1*Texp1)+(Tloss2+Tinit2+W2*Texp2)+ . . . +(TlossN+TinitN+WN*TexpN)]+TDN+TUN;

and wherein T represents time;

TL1 represents time for loading the first wafer by a photoresist development control machine;

TC1 represents time for forming a photoresist layer on the first wafer in the photoresist development control machine for the first wafer;

Tinit1 represent time for preparing an exposure of an exposure control machine for the first wafer;

Texp1 represents time for the exposure of the exposure machine for the first wafer;

Tloss2 represents idle time of the second wafer in the exposure control machine;

Tinit2 represent time for preparing an exposure of the exposure control machine for the second wafer;

Texp2 represents time for the exposure of the exposure machine for the second wafer;

TlossN represents idle time of the Nth wafer in the exposure control machine;

TinitN represent time for preparing an exposure of the exposure control machine for the Nth wafer;

TexpN represents time for the exposure of the exposure machine for the Nth wafer;

TDN represents time for development of a photoresist exposure control machine of the Nth wafer; and TUN represents time for unloading the Nth wafer from the photoresist development control machine; and displaying the average throughput.

11. The method of claim 10, wherein the result is an average throughput time of said operation event.

12. The method of claim 10, wherein the production factors comprise an idle time between said operation steps.

13. The method of claim 10, further comprises a device for setting standard values of said operation steps.

14. The method of claim 13, further comprises a device for setting optimum standard values of said operation steps.

15. The method of claim 13, further comprises comparing the time data and the related information with the corresponding preset standard values and displaying abnormalities indications according to the comparison results.

16. The method of claim 15, further comprises displaying a cause of the abnormalities.

* * * * *